Aug. 9, 1949.  E. PIGNONE  2,478,547

SLIDE RULE RUNNER

Filed Sept. 2, 1947

INVENTOR
EDWARD PIGNONE
BY
ATTORNEY

Patented Aug. 9, 1949

2,478,547

UNITED STATES PATENT OFFICE 2,478,547

SLIDE RULE RUNNER

Edward Pignone, New York, N. Y., assignor to American Blue Print Company, Inc., New York, N. Y., a corporation of New York Application September 2, 1947, Serial No. 771,816

4 Claims. (Cl. 235—70)

1

The invention relates to runners for slide rules and its novelty consists in the construction and adaption of the parts as will be more fully hereinafter pointed out, its principal object being to provide a runner in which the transparent cursor plate is held on guides without causing any internal stresses within the plate.

The runners now in use comprise guides for slidably engaging the sides of a slide rule to which are securely fastened glass or transparent material panel or panels by means of screws passing through the panel or by clamping means which grip the glass in a vice-like grip. All these fastening means bring pressure on a face of the panel to tightly hold the opposite face in engagement with the guides. This sets up internal stresses within the panel causing it to break due to excessive pressure or by expansion or contraction of the parts due to temperature changes.

The present invention uses substantially the same boxed construction in which guides are provided for slidably engaging the opposite edges of a slide rule and held in spaced relations thereto by a resilient member to promote proper engagement between one guide and one edge of the slide rule. A glass or other type of transparent plate extends across the space between the guides and is securely held to the guides under a bezel without setting up any internal stresses within the panel itself.

With this assembly the bezel exerts no pressure on the panel and the bevelled edge of each end of the plate is held under a bezel carried by the guides by arms extending laterally from the bezel embracing the longitudinal side edges. With this construction the panel is lightly but securely held in position without any compression strains being exerted thereon.

The foregoing and other features of my invention will now be described in connection with the accompanying drawing forming part of this specification in which I have shown my invention in its preferred form, after which I shall point out in the claims those features which I believe to be new and of my own invention.

In the drawings, Figure 1 is an enlarged plan view of a slide embodying an approved form of my invention.

Figure 1:
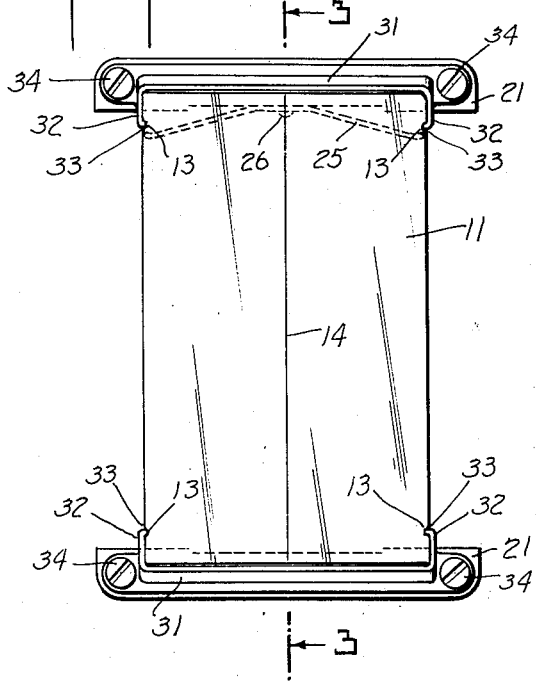

In the carrying out of my invention I provide a transparent plate 11, preferably made of glass, but I do not wish to limit myself to that material, rectangular in shape with the ends thereof bevelled as shown at 12. On both longitudinal edges I provide a plurality of notches 13 located down from the bevelled edges 12. A cursor line 14 is etched or ground on the upper surface midway between the longitudinal side edges.

This plate is held at each end in contact with two guides 21 by bezels 31. The bezel 31 is provided with a bevelled surface to fit complementary with the bevel 12 of the plate. Extending laterally from each end of the bezel 31 I provide arms 32 having on the ends thereof extensions 33 extending inwardly towards each other and spaced to enter the notches 13 of the plate 11. On the extreme ends of the bezel I provide holes through which screws 34 may pass to fasten the bezel to the guide.

To assemble the plate 11 to the guide 21, the extensions 33 of the arms 32 are placed in the notches 13 in the longitudinal edges of the plate, with the bevel 12 of the plate 11 fitting under the bezel. When the screws 34 are driven home, the plate is held in positive position on the guide without any compression forces acting on the plate to cause it to fracture or break.

Figure 2:
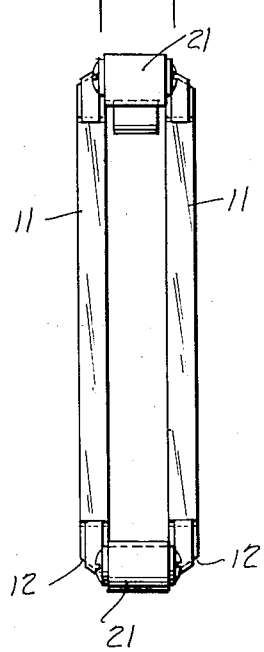
Fig. 2 is a side view thereof.
Figure 3:
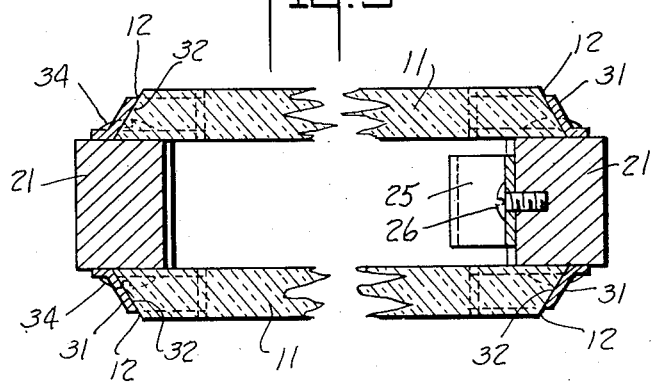
Figure 3 is a cross section through line 3—3, Figure 1.

When two plates are used as shown in detail in Figures 1, 2 and 3, the guides are a trifle thicker than the thickness of the slide rule on which it is to run. To keep the slide in spaced relation to the rule I provide a resilient member 25 which is fastened to the guide by means of screw 26 located in the center of the resilient member.

Figure 4:
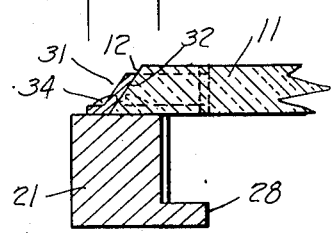
Figure 4 is a modification which I may employ.

When one plate is used, the construction shown in Figure 4 is used. To keep the runner on the slide rule, I provide a projection 28 as shown adapted to slide in a slot in the edge of the slide rule provided for the purpose.

It will be readily apparent from the above description that by proper placement of the notches 13 the bevel 12 of the plate is held snugly under the bezel thereby causing no internal stresses to be set up within the plate. This structure prevents entirely the breakage of the plate when the screws are tightened in the structures heretofore on the market while making adjustment of the indicator. It is further pointed out that with this new construction there is no pressure exerted either on the surface of the plate or any of the four edges.

With this simple construction less material is used in the manufacture and the stamping and binding dies are not complicated with less time consumed in actual stamping operation per piece, therefore less cost.

I wish it distinctly understood that my slide rule runner herein illustrated and described is in the form in which I desire to construct it and that changes or variations may be made as may be convenient without departing from the salient features of my invention and I therefore intend the following claims to cover such modifications as naturally fall within the lines of invention.

I claim:

1. A slide rule runner, comprising spaced guides for slidably engaging opposite edges of a slide rule, each provided with a bezel and two laterally extending arms projecting from substantially the end of the bezel, a transparent plate extending across the space between the guides having its two end edges beveled and two longitudinal edges at right angles to the plane of the plate and provided with a plurality of notches in the longitudinal edges, means carried by the arms for engaging the notches and holding the beveled edge of the plate within the bezel without any compression strain on the face of the plate.

2. A slide rule runner, comprising spaced guides for slidably engaging opposite edges of a slide rule, a bezel provided with two laterally extending arms located one at each end of the bezel and having inward projections at substantially right angles to the arms, means for securely fastening the bezel to the guides, a transparent plate extending across the space between the guides having its two end edges beveled on an angle to fit the angle of the bezel and two longitudinal edges at right angles to the plane of the plate, and provided with a plurality of notches in the longitudinal edges of the plate spaced down from the ends of the plate and adapted to receive the inwardly projecting portions of the arms.

3. A slide rule runner, comprising spaced guides for slidably engaging opposite edges of a slide rule, transparent plate extending across the space between the guides and having the edges of the plate which rests on the guides beveled and two longitudinal edges at right angles to the plane of the plate, and a plurality of notches in the longitudinal edges spaced away from the beveled edges, a bezel attached to the guides provided with laterally extending arms to embrace the notched edges to hold a bevel of the plate under the bezel without compression of the plate.

4. A slide rule runner comprising spaced guides for slidably engaging opposite edges of a slide rule, transparent plate having a cursor line mid-way the longitudinal edges, said plate being substantially rectangular in shape with the end edges beveled the longitudinal edges being substantially at right angles to the plane of the plate and a plurality of notches in the longitudinal edges spaced away from the corners of the plate, a bezel provided with laterally extending arms, means for fastening the bezel to the guides to hold the arms in the notches whereby the bevel of the plate is held within the bezel without compression on the plane of the plate.

EDWARD H. PIGNONE.

REFERENCES CITED

The following references are of record in the file of this patent:

UNITED STATES PATENTS

| Number | Name | Date |
|---|---|---|
| 2,407,338 | Kreiling | Sept. 10, 1946 |